J. SCHWEHR.
Method of Fastening Gems.

No. 219,772.        Patented Sept. 16, 1879.

Witnesses
Otto Aufeland
William Miller

Inventor.
Joseph Schwehr.
by
Van Santvoord Hauff
his attorneys.

UNITED STATES PATENT OFFICE.

JOSEPH SCHWEHR, OF PARIS, FRANCE.

IMPROVEMENT IN METHODS OF FASTENING GEMS.

Specification forming part of Letters Patent No. 219,772, dated September 16, 1879; application filed June 19, 1879.

*To all whom it may concern:*

Be it known that I, JOSEPH SCHWEHR, of Paris, France, have invented a new and useful Improved Method for Fastening Jewels, which invention is fully set forth in the following specification, reference being had to the accompanying drawings, in which—

Figure 1:
Figure 2:
Figure 3:
Figure 4:
Figure 5:
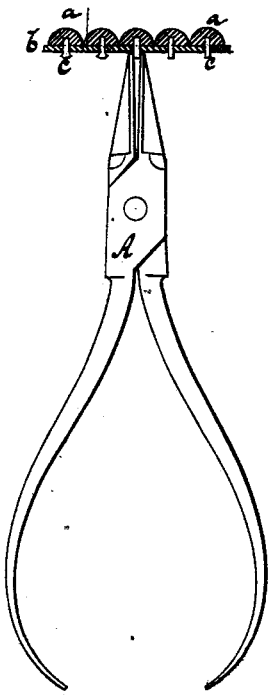

Figure 1 shows a section of a stem-stone. Fig. 2 is a plan view of the base-plate. Fig. 3 shows the stones set in the plate, the stem passing through the perforations. Fig. 4 is a similar view, showing the stems cut off to the proper length. Fig. 5 shows the method of fastening the jewels in the base-plate.

Similar letters indicate corresponding parts.

This invention consists in a method of fastening jewels by passing the stem of the jewel through a perforated base-plate to leave the setting in close proximity thereto, and then flattening the exposed part of the stem, so as to prevent the same from slipping, as will be hereinafter more fully described.

In the drawings, the letter $b$ designates a perforated base-plate of metal or other suitable material. The stones $a$ are set on this base-plate, their stems $c$ passing through the perforations.

Heretofore artificial gems have been connected to a metal base by melting the artificial gems onto metallic stems or pins, and then passing the latter through perforations in the metal base, where they are secured by riveting down the projecting ends of the stems, or by screwing or soldering said stems into position in the metal base. Such methods are objectionable for the reason that the riveting often breaks the same; further, to screw the stem into position, it must be done by force applied to the setting, which loosens and is liable to break it, and to solder the stem in place does not provide a secure connection; beside which the soldering is objectionable for the reason that the necessary application of heat will expand the metal stem in the gem and rupture or break it; and if such should not occur when the stem cools, it will contract, and thus cause a loose and insecure joint between the gem and its stem.

By my method the projecting part of the stem is pressed flat by a pinchers, A, or other suitable means, whereby it is prevented from slipping out. By this method much time, labor, and expense are saved, and the jewels are at the same time firmly secured.

Before being pressed, the stems $c$ are cut to the proper length, as shown in Fig. 4.

What I claim as new, and desire to secure by Letters Patent, is—

The method of fastening jewels upon a base-plate, as herein described, the same consisting in passing the stem of the wire which carries a glass, gem, or set through an opening in the base-plate, to have the setting in close proximity thereto, and then so pinching or flattening the exposed projecting end of the stem as to prevent movement of the wire, substantially as described, whereby all drawing action on the wire and consequent strain on the set during the operation are avoided, as set forth.

In testimony that I claim the foregoing I have hereunto set my hand and seal this 2d day of June, 1879.

JOS. SCHWEHR. [L. S.]

Witnesses:
ROBT. M. HOOPER,
DAVID T. S. FULLER.